(12) United States Patent
Park et al.

(10) Patent No.: US 7,924,917 B2
(45) Date of Patent: Apr. 12, 2011

(54) METHOD FOR ENCODING AND DECODING VIDEO SIGNALS

(75) Inventors: Seung Wook Park, Sungnam-si (KR); Ji Ho Park, Sungnam-si (KR); Byeong Moon Jeon, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 1569 days.

(21) Appl. No.: 11/257,148

(22) Filed: Oct. 25, 2005

(65) Prior Publication Data

US 2006/0093036 A1    May 4, 2006

Related U.S. Application Data

(60) Provisional application No. 60/621,688, filed on Oct. 26, 2004.

(30) Foreign Application Priority Data

Feb. 23, 2005    (KR) .................. 10-2005-0014843

(51) Int. Cl.
*H04N 7/12* (2006.01)
*H04N 11/04* (2006.01)

(52) U.S. Cl. .................. 375/240.12; 375/240.24

(58) Field of Classification Search .......... 382/232, 382/233, 238; 375/240.12, 240.13; 386/46, 386/109, 111, 112, 125; 348/403.1–409.1
See application file for complete search history.

(56) References Cited

U.S. PATENT DOCUMENTS

| | | | |
|---|---|---|---|
| 6,212,236 B1 * | 4/2001 | Nishida et al. | 375/240.12 |
| 7,734,151 B2 * | 6/2010 | Park et al. | 386/111 |
| 2006/0013309 A1 * | 1/2006 | Ha et al. | 375/240.16 |

* cited by examiner

*Primary Examiner* — Yon Couso
(74) *Attorney, Agent, or Firm* — Harness, Dickey & Pierce, P.L.C.

(57) ABSTRACT

A method for encoding video signals by inverse motion compensated temporal filtering where video frames of a base layer are used to encode video frames of an enhanced layer into predicted images. For each image block in an arbitrary frame in an enhanced layer frame sequence, an area including a block, which is present in a base layer frame temporally coincident with the arbitrary frame and is at the same position as the image block, is enlarged according to the ratio between screen sizes of the two layers. A reference block most highly correlated with the image block is searched for in the enlarged area in the temporally coincident base layer frame through motion estimation and is used to obtain pixel difference values and a motion vector of the image block for encoding the image block into a predicted image, thereby improving coding efficiency.

12 Claims, 7 Drawing Sheets

METHOD FOR ENCODING AND DECODING VIDEO SIGNALS

PRIORITY INFORMATION

This application claims priority under 35 U.S.C. §119 on Korean Patent Application No. 10-2005-0014843, filed on Feb. 23, 2005: the entire contents of which are hereby incorporated by reference.

This application also claims priority under 35 U.S.C. §119 on U.S. Provisional Application No. 60/621,688, filed on Oct. 26, 2004; the entire contents of which are hereby incorporated by reference.

BACKGROUND OF THE INVENTION

1. Field of the Invention

The present invention relates to a method for encoding and decoding video signals using scalable Motion Compensated Temporal Filtering (MCTF).

2. Description of the Related Art

While television broadcast signals require high bandwidth, it is difficult to allocate such high bandwidth for the type of wireless transmissions/receptions performed by mobile phones and notebook computers, for example. Thus, video compression standards for such devices must have high video signal compression efficiencies.

Such mobile devices have a variety of processing and presentation capabilities so that a variety of compressed video data forms must be prepared. This indicates that the same video source must be provided in a variety of forms corresponding to a variety of combination of variables such as the number of frames transmitted per second, resolution, the number of bits per pixel, etc. This imposes a great burden on content providers.

In view of the above, content providers prepare high-bitrate compressed video signals for each video source and perform, when receiving a request from a mobile device, a process of decoding the compressed video signals and encoding it back into video data suitable to the video processing capabilities of the mobile device before providing the requested video signals to the mobile device. However, this method entails a transcoding procedure including decoding, scaling and encoding processes, which causes some time delay in providing the requested signals to the mobile device. The transcoding procedure also requires complex hardware and algorithms to cope with the wide variety of target encoding formats.

A Scalable Video Codec (SVC) has been developed in an attempt to overcome these problems. This scheme encodes video signals into a sequence of pictures with the highest image quality while ensuring a certain level of image quality of the video when using part of the encoded picture sequence (specifically, a partial sequence of pictures intermittently selected from the total sequence of frames).

Motion Compensated Temporal Filtering (MCTF) is an encoding and decoding scheme that has been suggested for use in the scalable video codec.

Although it is possible to represent video signals in low image-quality by receiving and processing a part of the sequence of pictures encoded in the scalable MCTF coding scheme as described above, the image quality is significantly degraded as the bitrate is lowered. One solution to this problem is to provide an auxiliary picture sequence of low bitrates, for example, a sequence of pictures that have a small screen size and/or a small number of frames per second. The auxiliary picture sequence is referred to as a base layer, and a main picture sequence is referred to as an enhanced layer. Video signals of the base and enhanced layers have redundancy since the same video signal source is encoded into the two layers.

To improve the coding efficiency of the enhanced layer according to the MCTF scheme, one method generates a predicted image for each video frame of the enhanced layer based on a video frame of the base layer temporally coincident with the enhanced layer video frame. FIG. 1 illustrates how the predicted image for each video frame of the enhanced layer is generated based on a temporally coincident video frame of the base layer.

In this method, a small-screen auxiliary picture composed of a specific number of macroblocks of the base layer is unsampled so that the auxiliary picture is enlarged to have the same screen size as a video frame of the enhanced layer (S10). To produce a predicted image for a current macroblock EM10 in an enhanced layer frame E100, which is temporally coincident with the enlarged base layer picture B100, prediction is performed for the current macroblock EM10 based on a macroblock BM10 at the same position as the macroblock EM10 (S11). The difference (i.e., residual) of the macroblock EM10 of the enhanced layer from the macroblock BM10 of the base layer is encoded to the macroblock EM10 of the enhanced layer. The base layer macroblock BM10 used herein must be a block encoded in an intra mode. This is because a predicted block produced based on a different block in the same frame can be restored to a block having original pixel values based on the different block.

A base layer frame, which is coincident temporally with an enhanced layer frame, may not be present since the base and enhanced layers are encoded at different frame rates. If a base layer frame and an enhanced layer frame are present within a certain time gap, the two layer frames can be regarded as temporally coincident and a predicted image for the enhanced layer frame can be produced based on the base layer frame. The degree of identity between an image of a target macroblock in an enhanced layer frame, which is to be converted into a predicted image, and an image of a macroblock in an enlarged base layer frame at the same position as the target macroblock, may be reduced even if the base and enhanced layer frames are present within the certain time gap and thus can be regarded as temporally coincident. Further, since the small-screen frame of the base layer is enlarged for use, the positions of macroblocks in the two layer frames having the same image may differ by several pixel lines depending on the degree of enlargement.

In this case, the highest coding efficiency cannot be achieved if a predicted image for a target macroblock in the enhanced layer frame is produced using a macroblock in the enlarged base layer frame at the same position as the target macroblock as described above.

SUMMARY OF THE INVENTION

The present invention relates to encoding and decoding a video signal by motion compensated temporal filtering (MCTF).

In one embodiment, the method calls for decoding an encoded video signal using a first frame sequence and a second frame sequence by inverse motion compensated temporal filtering. It is determined whether one or more macroblocks in at least one frame in the second frame sequence are associated with a current macroblock in a current frame in the first frame sequence based on information included in a header of the current macroblock. Once it is determined whether the macroblocks are associated, the current macroblock is decoded based on the mode of the reference macroblock and whether the determined macroblocks are temporally coincident.

In another embodiment, the method for encoding a video signal by inverse motion compensated temporal filtering including a frame sequence includes encoding the video signal in a first scheme into a bitstream of a first layer. The video signal in a second scheme is then encoded into a bitstream of a second layer. The method then calls for searching for a reference block for an image block present in an arbitrary frame in a frame sequence present in the bitstream of the first layer, the reference block being present in an auxiliary frame in an auxiliary frame sequence present in the bitstream of the second layer, the auxiliary frame being temporally coincident with the arbitrary frame, and obtaining difference values of pixels of the image block based on the found reference block.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Example embodiments of the present invention will now be described in detail with reference to the accompanying drawings.

Figure 1:
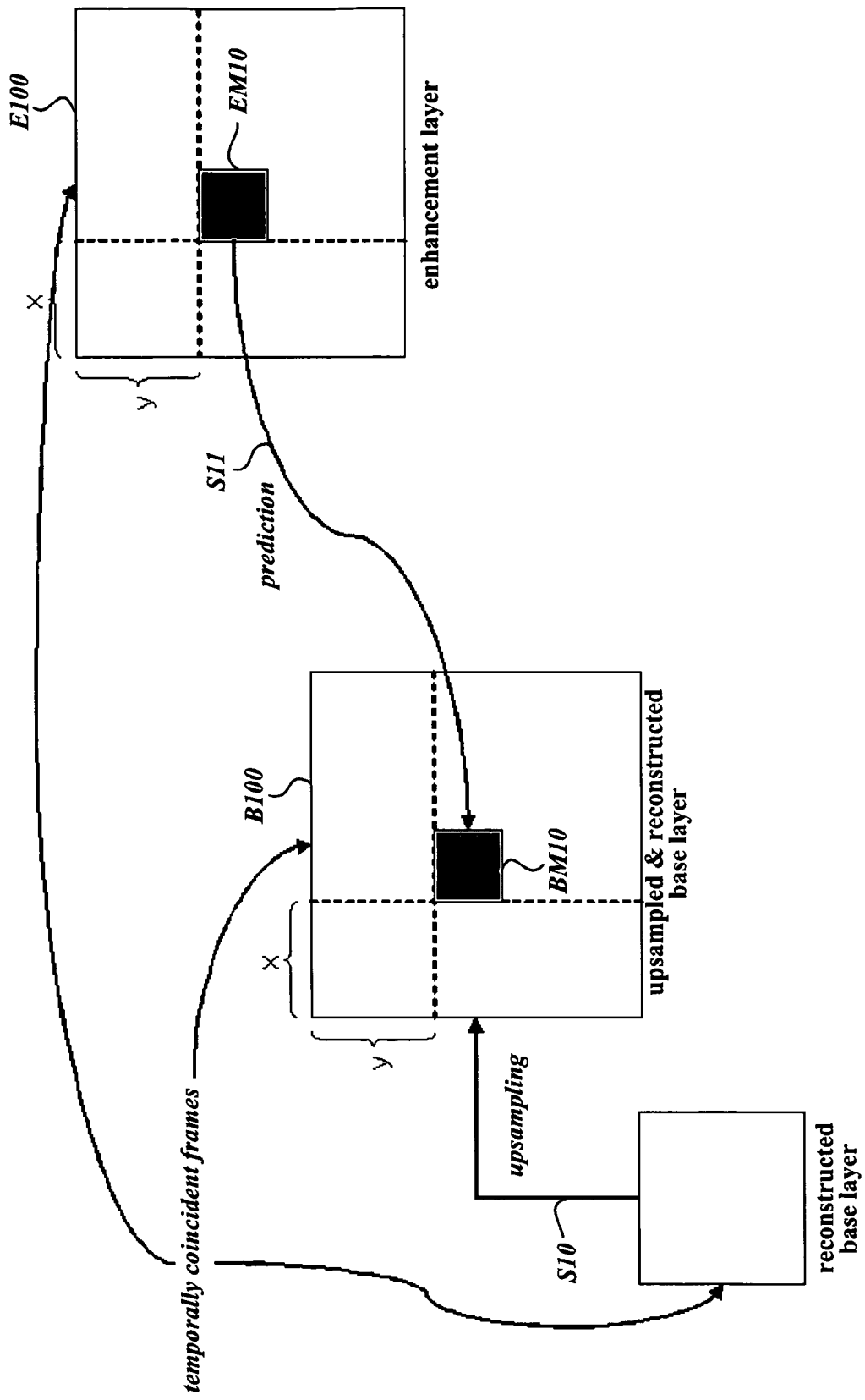
FIG. 1 illustrates how each target macroblock of an enhanced layer frame is converted into a predicted image using a block at the same position as the target macroblock in an enlarged base layer frame temporally coincident with the enhanced layer frame in the related art.
Figure 2:
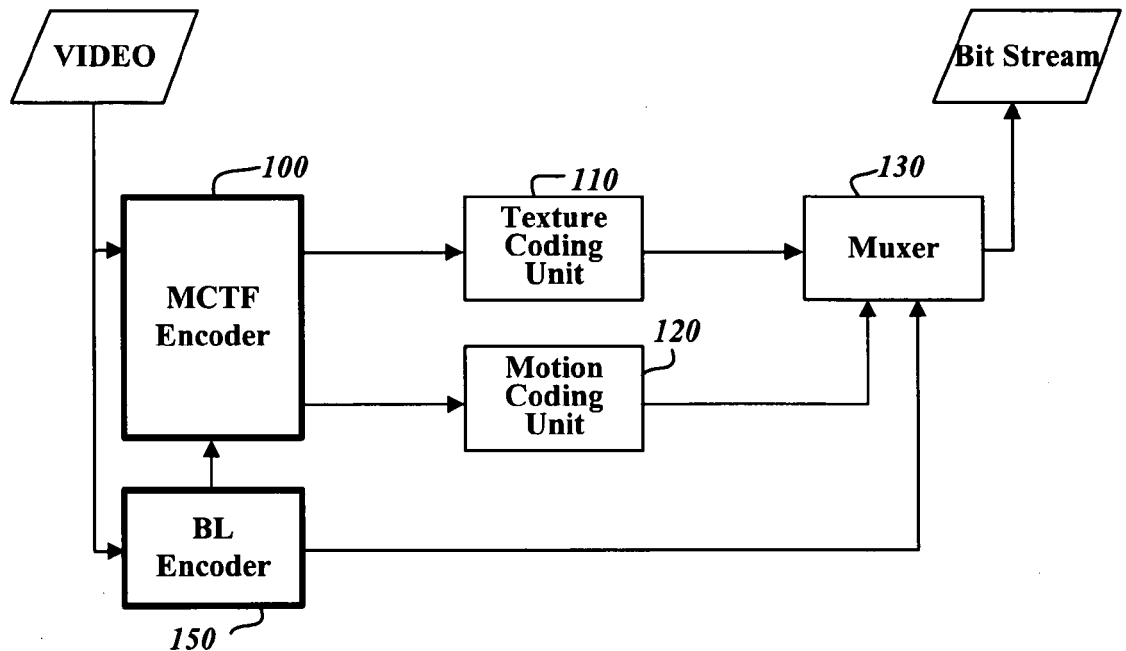
FIG. 2 is a block diagram of a video signal encoding device to which a video signal coding method is applied according to an example embodiment of the present invention.

FIG. 2 is a block diagram of a video signal encoding device for applying a scalable video signal compression method according to an example embodiment of the present invention.

The video signal encoding device shown in FIG. 2 comprises an MCTF encoder 100, a texture coding unit 110, a motion coding unit 120, a base layer encoder 150, and a muxer (or multiplexer) 130. The MCTF encoder 100 encodes an input video signal in units of macroblocks in an MCTF scheme, and generates suitable management information. The texture coding unit 110 converts information of encoded macroblocks into a compressed bitstream. The motion coding unit 120 encodes motion vectors of macroblocks obtained by the MCTF encoder 100 into a compressed bitstream according to a specified scheme. The base layer encoder 150 encodes an input video signal according to a specified scheme, for example, according to the MPEG-1, 2 or 4 standard or the H.261, H.263 or H.264 standard, and may produce a small-screen picture sequence, for example, a sequence of pictures scaled down to 25% of their original size, if necessary. The muxer 130 encapsulates output data from the texture coding unit 110, the small-screen picture sequence output from the base layer encoder 150, and the motion vector data of the motion coding unit 120 into a predetermined format. The muxer 130 then multiplexes and outputs the encapsulated data into a predetermined transmission format.

Figure 3:
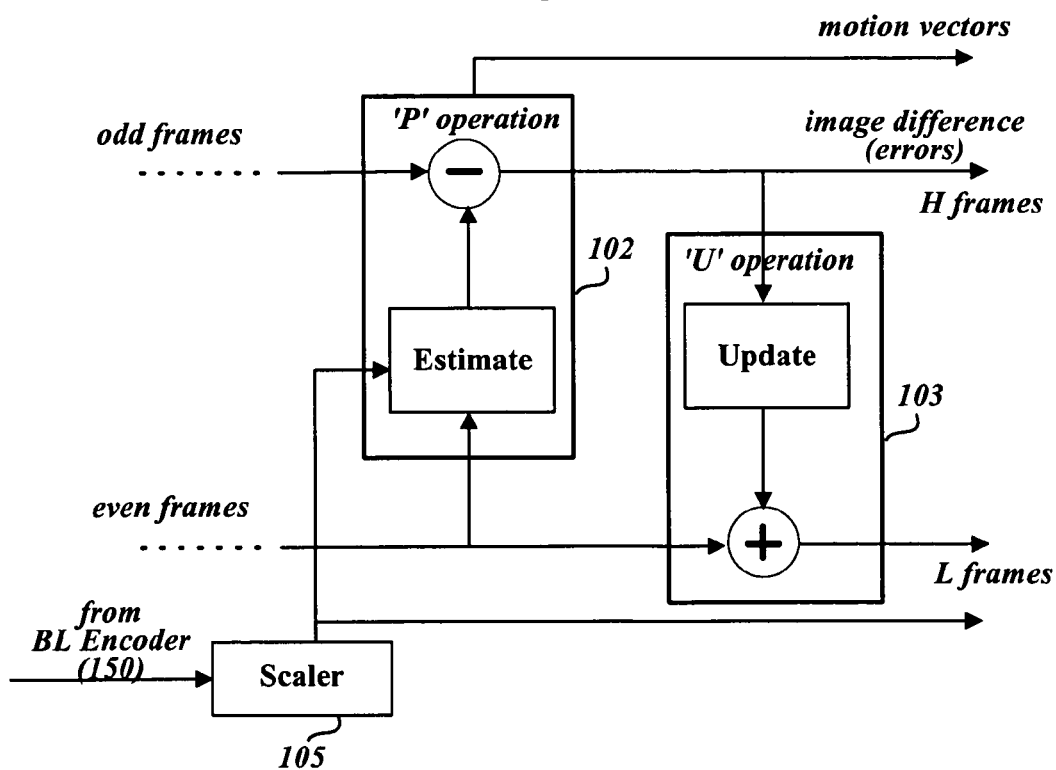
FIG. 3 is a block diagram of a part of a filter that performs image estimation/prediction and update operations in an MCTF encoder shown in FIG. 2.

The MCTF encoder 100 performs motion estimation and prediction operations on each target macroblock in a frame. The MCTF encoder 100 also performs an update operation in such a manner that an image difference of the target macroblock from a corresponding macroblock in a neighbor frame is added to the corresponding macroblock in the neighbor frame. FIG. 3 is a block diagram of a part of a filter that carries out these operations.

The MCTF encoder 100 separates an input video frame sequence into odd and even frames and then performs estimation/prediction and update operations on a certain-length sequence of pictures. For example, the MCTF encoder 100 may reduce the number of L frames to one or two from a Group Of Pictures (GOP) by repeating the update operation.

FIG. 3 shows elements associated with estimation/prediction and update operations at one of a plurality of MCTF levels. The elements of FIG. 3 include an estimator/predictor 102, an updater 103, and a scaler 105. The scaler 105 restores the original image size of a small-screen sequence received from the base layer encoder 150 through an upsampling operation. The estimator/predictor 102 performs a motion estimation operation for searching for a reference block for each target macroblock of a current frame, which is to be encoded to residual data, in a neighbor frame prior to or subsequent to the current frame, and a motion prediction operation for calculating an image difference (i.e., a pixel-to-pixel difference) of the target macroblock from the reference block and a motion vector from the target macroblock to the reference block. The estimator/predictor 102 may also perform a prediction operation for each target macroblock of the current frame in such a manner that it searches for a reference block of the target macroblock in a base layer frame temporally coincident with the current frame, whose size has been restored by the scaler 105, and calculates an image difference of the target macroblock from the reference block. The updater 103 performs an update operation for a macroblock, which has served as a reference block for the target block in the motion estimation/prediction operation, in such a manner that it normalizes the calculated image difference of the target macroblock from the reference block and adds the normalized value to the macroblock (the reference block). The operation carried out by the updater 103 is referred to as a 'U' operation, and a frame produced by the 'U' operation is referred to as an 'L' frame.

The estimator/predictor 102 and the updater 103 of FIG. 2 may perform their operations on a plurality of slices, which are produced by dividing a single frame, simultaneously and in parallel instead of performing its operations on the video frame. A frame (or slice) having an image difference, which is produced by the estimator/predictor 102, is referred to as an 'H' frame (or slice) since the difference value data in the 'H' frame (or slice) reflects high frequency components of the video signal. In the following description of the example embodiments, the term 'frame' is used in a broad sense to include a 'slice', provided that replacement of the term 'frame' with the term 'slice' is technically equivalent.

For example, the estimator/predictor 102 divides each of the input video frames (or each L frame obtained at the previous level) into macroblocks of a predetermined size. The estimator/predictor 102 determines whether or not the enlarged base layer frame received from the scaler 105 is temporally coincident with the input video frame. If the enlarged base layer frame received from the scaler 105 is not temporally coincident with the input video frame, the estimator/predictor 102 performs a procedure for searching for an image block, whose image is most similar to that of each divided macroblock, in temporally adjacent frames prior to or subsequent to the input video frame, and producing a predicted image and a motion vector for each divided macroblock based on the found image block.

Figure 4:
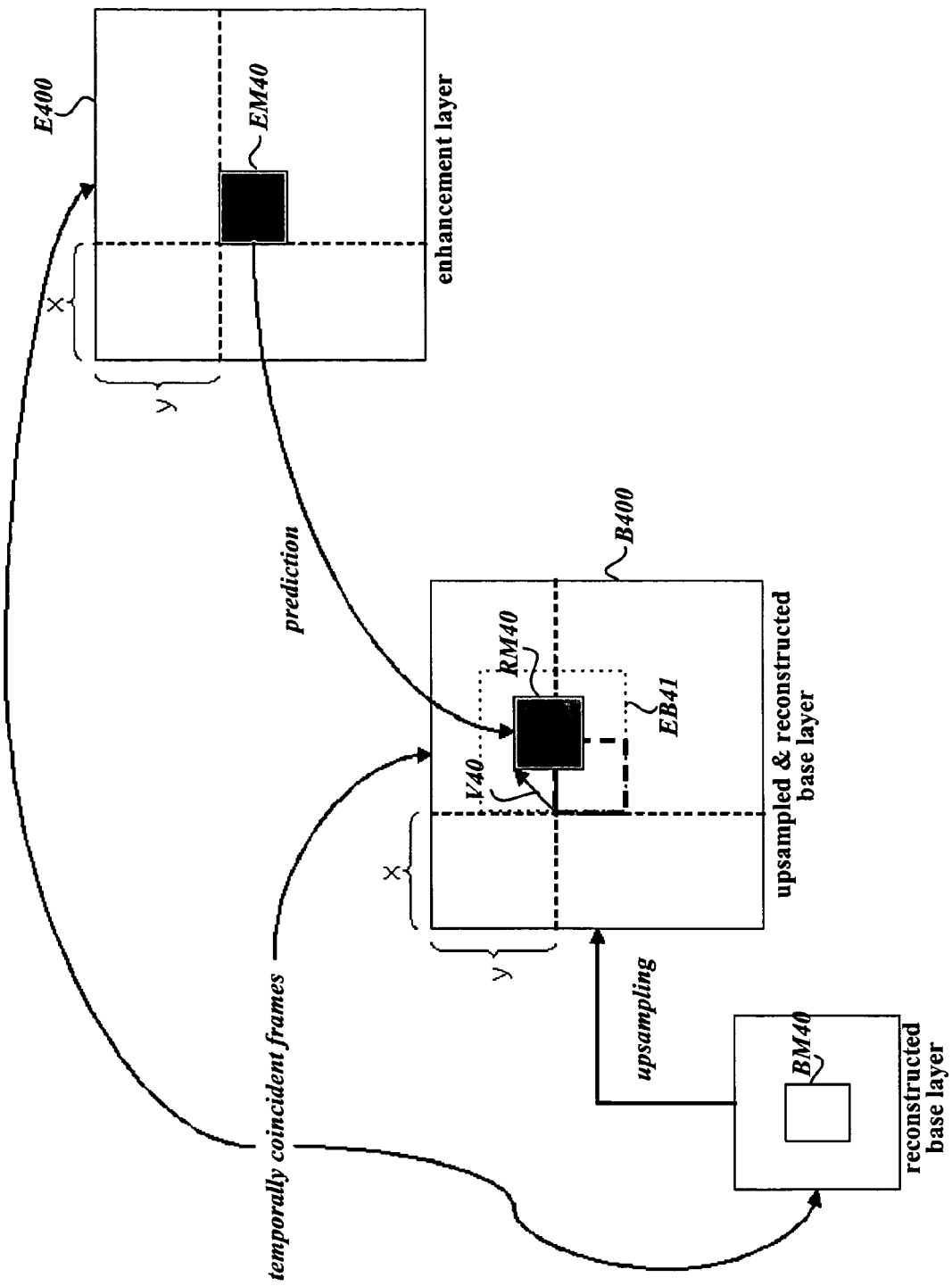
FIG. 4 illustrates how a reference block and a motion vector for each target macroblock in an enhanced layer frame is searched for in an enlarged base layer frame temporally coincident with the enhanced layer frame through motion estimation, and a predicted image for the target macroblock is produced according to an example embodiment of the present invention.

A detailed description of this procedure is omitted since it is known in the art and is not directly related to the present invention. Instead, a procedure for producing a predicted image for each macroblock in an input video frame using an enlarged base layer frame temporally coincident with the input video frame according to the present invention will now be described in detail with reference to FIG. 4.

If an enlarged base layer frame B400 provided from the scaler 105 is temporally coincident with a current enhanced layer frame E400 which is to be converted to a predicted image, the estimator/predictor 102 determines whether or not an area EB41 corresponding to a current macroblock EM400, which is to be converted to a predicted image, in the enlarged base layer frame B400, has been enlarged from a macroblock BM40 encoded in an intra mode by the base layer encoder 150. The intra mode information and time information of the base layer frame is read from a header in the base layer stream.

If the corresponding area EB41 is enlarged from a block encoded in a mode other than the intra mode (i.e., from an inter-mode block), the estimator/predictor 102 performs a motion prediction procedure for producing a predicted image using a macroblock in the prior or subsequent frame of the enhanced layer as known in the art.

If the corresponding area EB41 is enlarged from a block encoded in the intra mode, the estimator/predictor 102 first restores an original image of the area EB41 based on pixel values of a different area that is an intra-mode reference of the area EB41. The procedure for restoring the original image of the intra-mode macroblock may be performed before the intra-mode macroblock is enlarged.

The estimator/predictor 102 searches for a macroblock most highly correlated with the current macroblock EM40 in the enlarged area EB41 or an area including and larger than the area EB41. The block most highly correlated with a target block is a block having the smallest image difference from the target block. The image difference of two image blocks is defined, for example, as the sum or average of pixel-to-pixel differences of the two image blocks. The block having the smallest image difference is referred to as a reference block.

Figure 5:
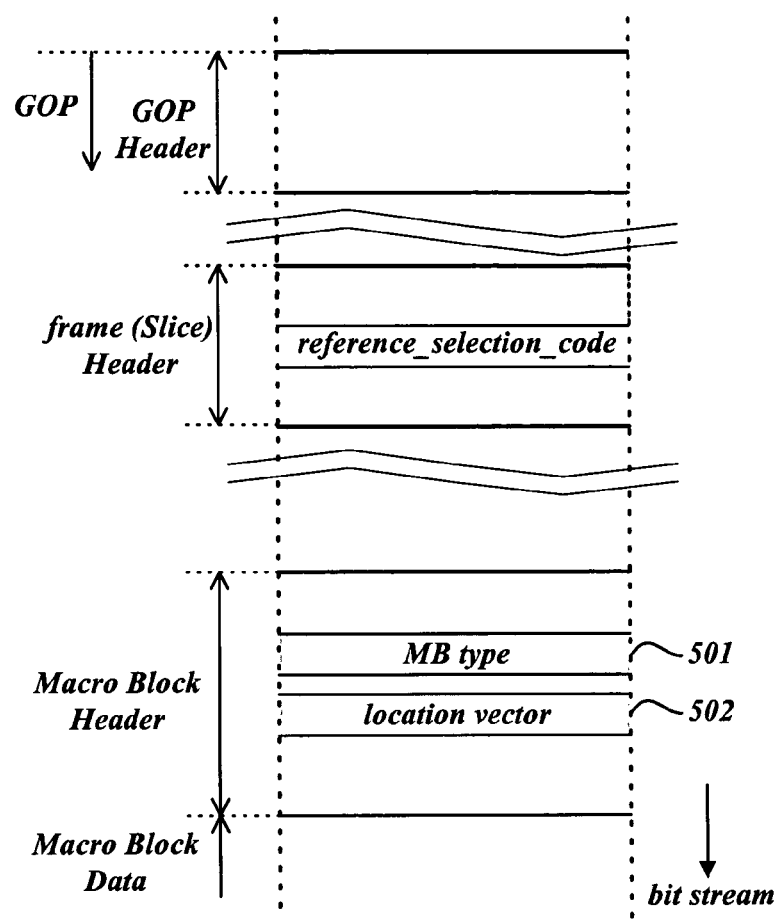
FIG. 5 illustrates the structure of information required due to use of the base layer, which is carried in a bitstream of the enhanced layer according to an example embodiment of the present invention.

If the reference block (for example, a block RM40 shown in FIG. 4) is found, the estimator/predictor 102 determines a vector V40 corresponding to the difference between positions of the current block EM40 and the found block RM40, and determines errors (i.e., differences) between pixel values of the reference block RM40 and corresponding pixel values of the current block EM40. The estimator/predictor 102 encodes the determined pixel differences into the current block EM40, and outputs the encoded block. The location vector V40 contains no time-domain value since it is based on the temporally coincident base layer frame. As illustrated in FIG. 5, information 502 regarding the location vector V40, together with macroblock type information 501, can be recorded in a header of the current macroblock EM40. The macroblock type information includes a value indicating whether or not a base layer macroblock has been used as the reference block. Also, as shown in FIG. 5, information indicating whether or not a temporally coincident base layer frame has been additionally used as a reference frame for prediction may be recorded in a specific field (for example, a 'reference_selection_code' field) in a header of the current frame.

The information of the location vector V40 can be expressed based on the small screen size of the base layer frame before enlarging. For example, in the example of FIG. 4, if the small screen of the base layer has been both horizontally and vertically doubled, the determined location vector V40 is reduced by half to be recorded. This reduces variations in the location vector value, thereby improving coding efficiency.

Such an operation of the estimator/predictor 102 is referred to as a 'P' operation. A frame produced by the 'P' operation is referred to as an 'H' frame.

The size of a search area to be searched in the enlarged base layer frame B400 is determined in the procedure for producing the predicted image for each target macroblock EM40 in the current enhanced layer frame E400. The search area is determined as an area enlarged from the base layer macroblock or as a larger area than the enlarged area.

Figure 6A:
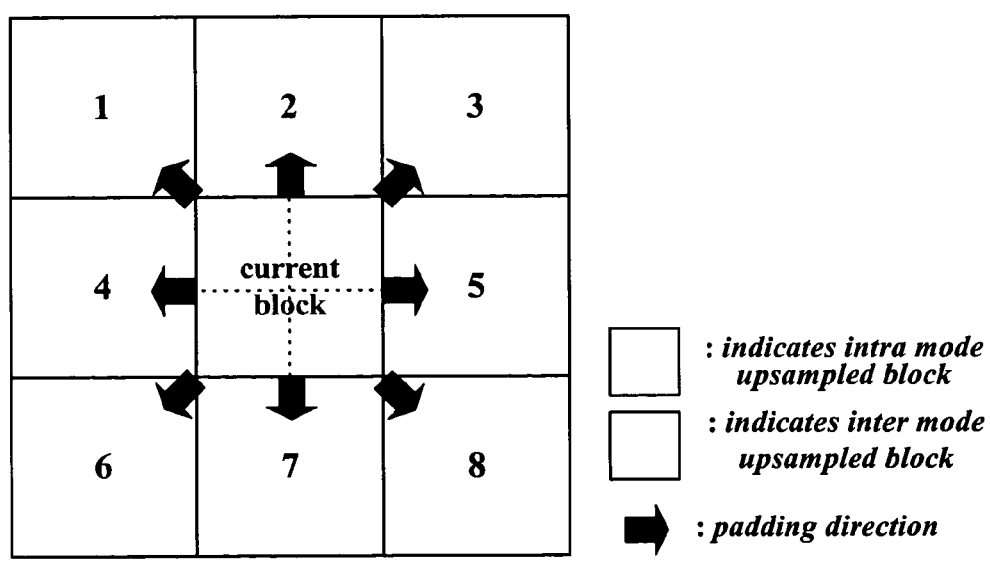
FIGS. 6a to 6c illustrate how padding is performed for areas surrounding central areas in enlarged base layer frames depending on coding modes of the surrounding areas according to an example embodiment of the present invention.
Figure 6B:
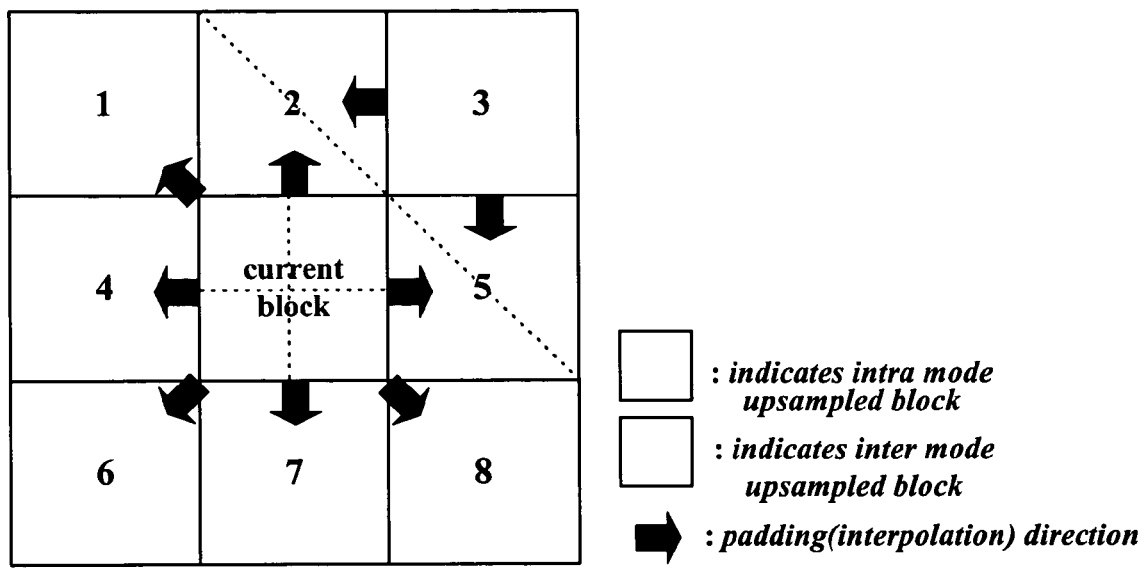
Figure 6C:
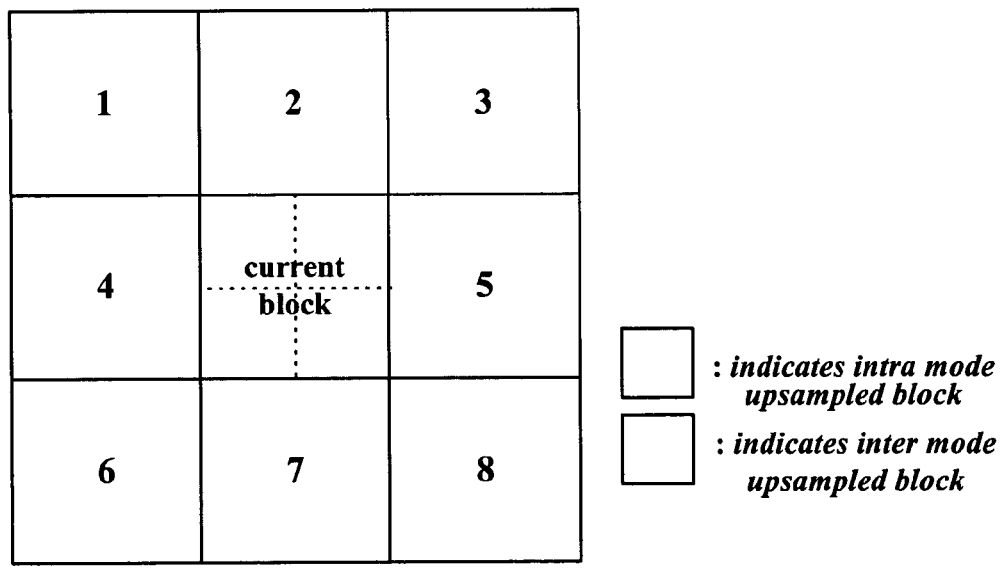

For example, as shown in FIGS. 6a to 6c, if both the base layer and the enhanced layer use macroblocks, each 16×16 pixels in size, and the screen size of the base layer is a quarter of that of the enhanced layer, an enlarged base layer macroblock is an area of 32×32 pixels. Here, the boundaries of the target block of the enhanced layer match the boundaries of the 32×32 area. There is a need to search an area including and larger than an enlarged area including a block corresponding to the target macroblock, for example, an area including and larger than a central area shown in FIGS. 6a to 6c. That is, it is desirable to search an area surrounding a block in the enlarged frame at the same position as the current block.

If all 8 enlarged areas adjacent to the area (i.e., the central area) including the block corresponding to the current macroblock have been obtained from intra-mode macroblocks as shown in FIG. 6c, image values of the areas outside the boundaries of the central area can be restored and used without alteration in the searching for prediction. However, if some enlarged areas adjacent to the central area are not intra-mode areas as shown in FIGS. 6a and 6b, pixel values of the areas are error values that cannot be restored to original images using the current base layer frame alone, and thus coding efficiency may be reduced if the reference block is searched for using the pixel values of the areas without alteration and is then used for coding.

Accordingly, pixel values of the adjacent areas, which are not intra-mode areas, are padded. For example, if all 8 adjacent areas are not intra-mode areas as shown in FIG. 6a, pixel values in the boundaries of the central enlarged intra-mode area are copied and padded to the 8 adjacent areas. If one of the 8 adjacent enlarged areas 3 has been obtained from an intra-mode macroblock, areas 2 and 5 adjacent to the area 3 are padded with combinations of boundary pixel values of the area 3 and boundary pixel values of the current central area, for example, padded with values obtained through interpolation therebetween. The boundary pixel values of the central area are copied and padded to the remaining areas 1, 4, 6, 7, and 8 in the same manner as in FIG. 6a.

After new pixel values of the enlarged areas, which are not intra-mode areas, are produced based on the current enlarged area or its adjacent intra-mode areas in this manner, a reference block is searched for in an appropriate range of blocks surrounding a block in the enlarged frame at a position thereof corresponding to the current enhanced layer macroblock, and a difference value of the current macroblock from the reference block is encoded into the current macroblock to convert the current macroblock into a predicted image.

The bitstream encoded in the method described above is transmitted by wire or wirelessly to a decoding device or is delivered via recording media. The decoding device restores the original video signal in the enhanced and/or base layer according to the method described below.

Figure 7:
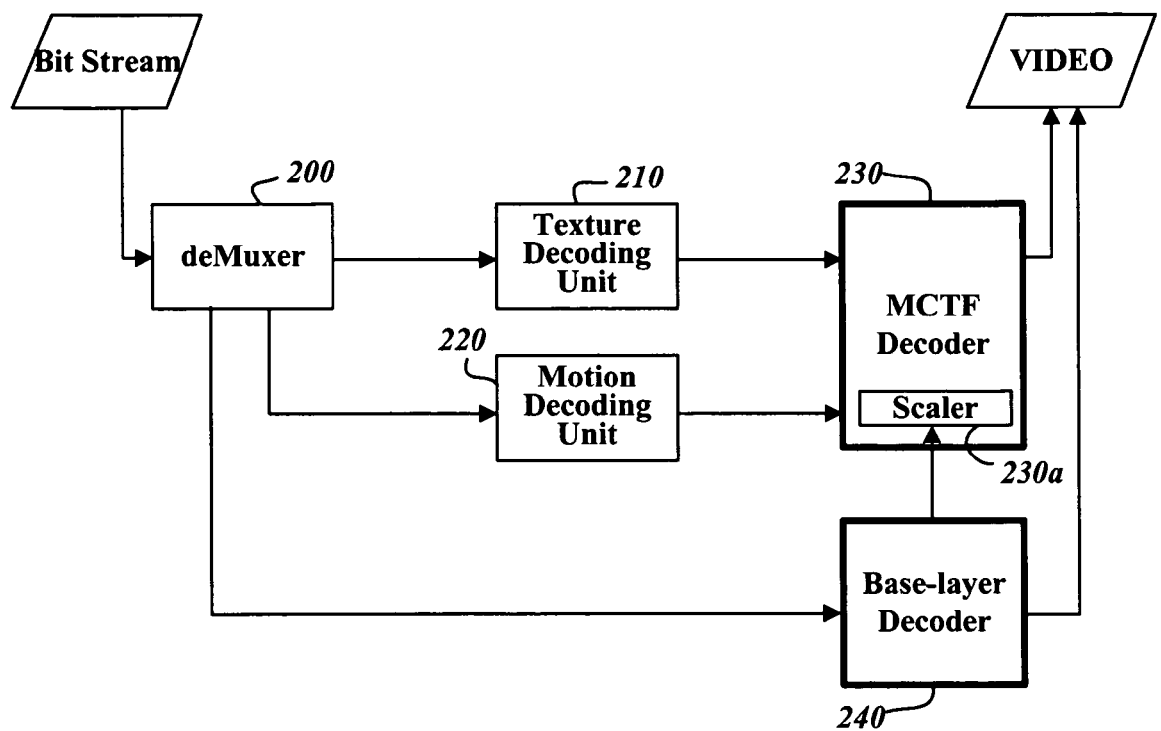
FIG. 7 is a block diagram of a device for decoding a bitstream encoded by the device of FIG. 2.

FIG. 7 is a block diagram of a device for decoding a bitstream encoded by the device of FIG. 2. The decoding device of FIG. 7 includes a demuxer (or demultiplexer) 200, a texture decoding unit 210, a motion decoding unit 220, an MCTF decoder 230, and a base layer decoder 240. The demuxer 200 separates a received bitstream into a compressed motion vector stream, a compressed macroblock information stream, and a base layer stream. The texture decoding unit 210 decodes the compressed bitstream. The motion decoding unit 220 decodes the compressed motion vector information. The MCTF decoder 230 decodes the bitstream containing macroblock information and the motion vector according to an MCTF scheme. The base layer decoder 240 decodes the base layer stream according to a specified scheme, for example, according to the MPEG-4 or H.264 standard. The MCTF decoder 230 includes therein a scaler 230a that enlarges a small-screen picture sequence in the base layer to the enhanced layer picture size. For a small-screen frame in an input base layer stream, the base layer decoder 240 decodes images of intra-mode macroblocks in the small-screen frame that can be restored using only the pixel values in the small-screen frame. Before decoding the remaining blocks in the small-screen frame, which have different modes from the intra-mode, the base layer decoder 240 provides the small-screen frame to the scaler 230a so as to be used by the MCTF decoder 230. The scaler 230a may be provided as a separate unit outside the MCTF decoder 230.

Figure 8:
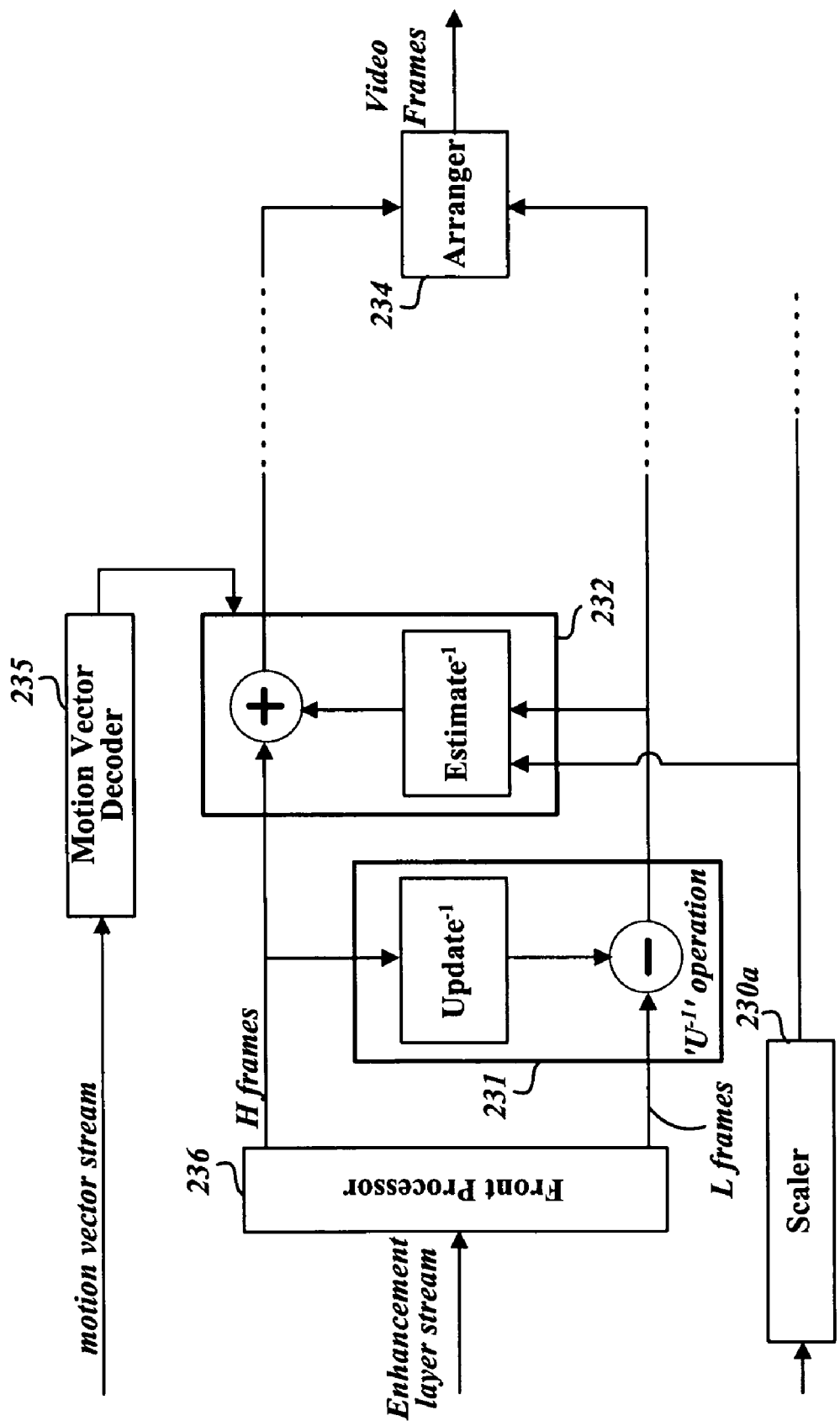
FIG. 8 is a block diagram of part of an inverse filter that performs inverse prediction and update operations in an MCTF decoder shown in FIG. 7.

The MCTF decoder 230 includes elements as shown in FIG. 8 for decoding an input bitstream into a frame sequence having an original image.

The elements of the MCTF decoder 230 of FIG. 8 include a front processor 236, an inverse updater 231, an inverse predictor 232, a motion vector decoder 235, and an arranger 234. The front processor 236 divides an input enhanced layer stream into H frames and L frames, and analyzes information in each header in the enhanced layer stream. The inverse updater 231 subtracts pixel difference values of input H frames from corresponding pixel values of input L frames. The inverse predictor 232 restores input H frames to frames having original images with reference to the L frames, from which the image differences of the H frames have been subtracted in the inverse updater 231, and/or with reference to enlarged pictures output from the scaler 230a. The motion vector decoder 235 decodes an input motion vector stream into motion vector information of each block and provides the motion vector information to the inverse predictor 232. The arranger 234 interleaves the frames completed by the inverse predictor 232 between the L frames output from the inverse updater 231, thereby producing a normal video frame sequence.

Although one inverse updater 231 and one inverse predictor 232 are illustrated above, the inverse updaters 231 and the inverse estimators 232 are provided in multiple stages corresponding to the MCTF encoding levels described above.

The front processor 236 analyzes and divides an input enhanced layer stream into an L frame sequence and an H frame sequence. In addition, the front processor 236 uses information in each header in the enhanced layer stream to notify the inverse predictor 232 of which frame or frames have been used to produce macroblocks in the H frame. The used frame or frames can be determined from information recorded in a received 'reference_selection_code' field shown in FIG. 5.

In the case where an adjacent frame of the enhanced layer has been used as a reference frame of a current H frame, the conventional MCTF decoding method is applied to restore an original image of the current H frame, and thus a description of this case is omitted. Instead, a description will now be given of a decoding method according to an example embodiment of the present invention applied when a base layer frame has been used as a reference frame.

To restore an original image of each target macroblock in the current H frame, whose header indicates that a base layer block has been used as a reference block, the inverse predictor 232 pads pixel values of all non-intra-mode blocks present in an enlarged base layer frame from the scaler 230a, which is temporally coincident with the current H frame and which has been used to produce a predicted image for the target macroblock. This padding can be performed in the same manner as described above with reference to FIGS. 6a and 6b. The size of an area to be padded may differ from that in the encoding procedure.

For example, pixel values in the boundaries of an enlarged intra-mode block corresponding to the target block in the current H frame are copied and padded to enlarged blocks adjacent to the enlarged intra-mode block, or values obtained through interpolation between the boundary pixel values of the enlarged intra-mode block corresponding to the target block and the boundary pixel values of another enlarged intra-mode block are padded to non-intra-mode enlarged blocks adjacent to the enlarged intra-mode block corresponding to the target block. Alternatively, padding may be performed only within a range of blocks specified by a location vector present in a header of the target block. Specifically, if some areas enlarged from non-intra-mode base layer blocks are present in the specified range of blocks, only the enlarged non-intra-mode areas within the specified range of blocks are padded. There is no need to perform padding if all blocks specified by the location vector are present in areas enlarged from intra-mode base layer macroblocks.

After completing the padding procedure (or without performing the padding procedure), the inverse predictor 232 restores an original image of the target block in the current H frame by adding pixel values of the macroblock area (for example, a 16×16 area) specified by the location vector to difference values of pixels of the target bock.

For one H frame, the MCTF decoding is performed in specified units, for example, in units of slices in a parallel fashion, so that all macroblocks in the frame restore their original images, and the original images are combined to constitute a complete video frame.

The above decoding method restores an MCTF-encoded bitstream to a complete video frame sequence using the base layer. In the case where the estimation/prediction and update operations have been performed for a GOP N times (i.e., up to the Nth MCTF level) in the MCTF encoding procedure described above, a video frame sequence with the original image quality is obtained if the inverse prediction and update operations are performed N times, whereas a video frame sequence with a lower image quality and at a lower bitrate is obtained if the inverse prediction and update operations are performed less than N times. However, it is possible to achieve a higher image quality by decoding and outputting a frame sequence in the base layer, instead of obtaining a low bitrate video frame sequence according to the MCTF scheme. Accordingly, the decoding device is designed to perform inverse prediction and update operations to the extent suitable for its performance or is designed to decode only the base layer streams.

The decoding device described above can be incorporated into a mobile communication terminal or the like or into a media player.

As is apparent from the above description, a method and a device for encoding/decoding video signals according to the present invention achieves more accurate prediction using frames of the base layer, provided for low-performance decoders, in addition to frames of the enhanced layer, so that MCTF coding efficiency is improved in the case where the amount of redundancy between the two layers can be reduced more than the amount of additional information such as a location vector provided due to the use of the base layer.

Although this invention has been described with reference to the preferred embodiments, it will be apparent to those skilled in the art that various improvements, modifications, replacements, and additions can be made in the invention without departing from the scope and spirit of the invention. Thus, it is intended that the invention cover the improvements, modifications, replacements, and additions of the invention, provided they come within the scope of the appended claims and their equivalents.

What is claimed is:

1. A method of decoding a video signal by a video decoding apparatus, comprising:
   first obtaining, with the video decoding apparatus including a processor, a pixel value of a corresponding block in a base layer, the corresponding block being referred by a current block in an enhanced layer, the first obtaining including obtaining a pixel value of a padding area by using a pixel value of a neighboring block in the base layer when an inter macroblock of the base layer covers the corresponding block of the base layer, the padding area being an area of the corresponding block covered by the inter macroblock of the base layer, the neighboring block being a block adjacent to the padding area;
   upsampling, with the video decoding apparatus, the pixel value of the corresponding block in the base layer;
   second obtaining, with the video decoding apparatus, a predicted pixel value of a target block in an enhanced layer by using the upsampled pixel value of the corresponding block; and
   reconstructing, with the video decoding apparatus, the target block by using the predicted pixel value of the target block and a residual of the target block,
   the residual of the target block being a difference value between the predicted pixel value of the target block and a pixel value of the target block.

2. The method of claim 1, wherein a macroblock of the base layer that covers the corresponding block is coded in intra mode.

3. The method of claim 1, wherein the pixel value of the corresponding block is included one slice of the base layer.

4. The method of claim 1, wherein the neighboring block is an area of the corresponding block covered by an intra macrocblock of the base layer.

5. The method of claim 1, wherein the pixel value of the padding area is obtained by interpolating the pixel value of the neighboring block.

6. The method of claim 5, wherein the pixel value of the neighboring block is at least one pixel value being in a boundary of the neighboring block.

7. An apparatus of decoding a video signal, comprising:
   an enhanced layer decoder configured to,
      obtain a pixel value of a corresponding block in a base layer, the corresponding block being referred by a current block in an enhanced layer, a pixel value of a padding area of the corresponding block being obtained by using a pixel value of a neighboring block in the base layer when an inter macroblock of the base layer covers the corresponding block of the base layer, the padding area being an area of the corresponding block covered by the inter macroblock of the base layer, the neighboring block being a block adjacent to the padding area,
      upsample the pixel value of the corresponding block in the base layer,
      to obtain a predicted pixel value of a target block in an enhanced layer by using the upsampled pixel value of the corresponding block, and
      reconstruct the target block by using the predicted pixel value of the target block and a residual of the target block, the residual of the target block being a difference value between the predicted pixel value of the target block and a pixel value of the target block.

8. The apparatus of claim 7, wherein the neighboring block is an area of the corresponding block covered by an intra macrocblock of the base layer.

9. The apparatus of claim 7, wherein the pixel value of the padding area is obtained by interpolating the pixel value of the neighboring block.

10. The apparatus of claim 9, wherein the pixel value of the neighboring block is at least one pixel value being in a boundary of the neighboring block.

11. The apparatus of claim 7, wherein a macroblock of the base layer that covers the corresponding block is coded in intra mode.

12. The apparatus of claim 7, wherein the pixel value of the corresponding block is included in one slice of the base layer.

* * * * *